(12) United States Patent
Notohamiprodjo et al.

(10) Patent No.: US 7,924,584 B1
(45) Date of Patent: Apr. 12, 2011

(54) POWER SUPPLY SWITCHING CIRCUIT FOR A HALOGEN LAMP

(75) Inventors: Hubertus Notohamiprodjo, Union City, CA (US); Liang Chen, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 305 days.

(21) Appl. No.: 11/019,925

(22) Filed: Dec. 21, 2004

Related U.S. Application Data

(60) Provisional application No. 60/540,195, filed on Jan. 29, 2004.

(51) Int. Cl.
*H02M 7/217* (2006.01)

(52) U.S. Cl. ........... 363/79; 323/301; 323/905; 315/308

(58) Field of Classification Search ............... 363/21.06, 363/127, 21.04, 21.1, 172, 65, 71, 79, 95, 363/35, 21.08, 21.11, 149, 153, 164, 171; 315/308, 306, 278, DIG. 4; 323/905, 301, 323/302
See application file for complete search history.

(56) References Cited

U.S. PATENT DOCUMENTS

| | | | |
|---|---|---|---|
| 4,741,010 A | 4/1988 | Hino et al. | |
| 4,949,016 A | 8/1990 | De Bijl et al. | |
| 4,952,849 A * | 8/1990 | Fellows et al. | 315/307 |
| 5,089,751 A * | 2/1992 | Wong et al. | 315/279 |
| 5,283,727 A * | 2/1994 | Kheraluwala et al. | 363/98 |
| 5,371,440 A * | 12/1994 | Liu et al. | 315/307 |
| 5,461,287 A | 10/1995 | Russell et al. | |
| 5,515,257 A * | 5/1996 | Ishii | 363/21.1 |
| 5,604,409 A * | 2/1997 | Fisher | 315/219 |
| 5,615,093 A | 3/1997 | Nalbant | |
| 5,757,630 A * | 5/1998 | Lesea | 363/39 |
| 5,850,127 A * | 12/1998 | Zhu et al. | 315/307 |
| 5,907,223 A | 5/1999 | Gu et al. | |
| 6,094,017 A * | 7/2000 | Adamson | 315/307 |
| 6,111,769 A * | 8/2000 | Zhang et al. | 363/127 |
| 6,377,107 B1 | 4/2002 | Franck | |
| 6,459,600 B2 * | 10/2002 | Farrington et al. | 363/89 |
| 6,696,803 B2 | 2/2004 | Tao et al. | |
| 6,784,622 B2 * | 8/2004 | Newman et al. | 315/219 |
| 6,856,098 B2 * | 2/2005 | Piaskowski | 315/224 |
| 6,876,157 B2 | 4/2005 | Henry | |
| 6,940,733 B2 * | 9/2005 | Schie et al. | 363/21.12 |
| 7,053,561 B2 | 5/2006 | Mayer et al. | |
| 7,067,991 B2 * | 6/2006 | Hsu et al. | 315/224 |
| 7,183,724 B2 | 2/2007 | Ball | |
| 2002/0097006 A1 | 7/2002 | Chao | |
| 2002/0149890 A1 | 10/2002 | Kaneko et al. | |
| 2004/0012346 A1 | 1/2004 | Green et al. | |
| 2004/0085792 A1 | 5/2004 | Lin et al. | |
| 2004/0155602 A1 | 8/2004 | Buij et al. | |
| 2006/0175986 A1 | 8/2006 | Crouse et al. | |
| 2007/0138971 A1* | 6/2007 | Chen | 315/209 R |

OTHER PUBLICATIONS

Bhavaraju and Enjeti, A Fast Active Power Filer to Correct Line Voltage Sags, Jun. 1994, IEEE Transactions on Industrial Electronics, vol. 41, No. 3, pp. 333-338.*
George Ellis, Control System Design Guide, Academic Press, 2nd Edition, pp. 159-173.*

* cited by examiner

*Primary Examiner* — Harry Behm

(57) ABSTRACT

A power supply and methods are provided. The power supply includes a bi-forward converter and a feed forward circuit. The bi-forward converter is operable to convert an input voltage into an output voltage. The feed forward circuit is operable to detect a peak voltage associated with the input voltage, and the bi-forward converter is further operable to adjust the output voltage responsive to the peak voltage detected by the feed forward circuit.

41 Claims, 10 Drawing Sheets

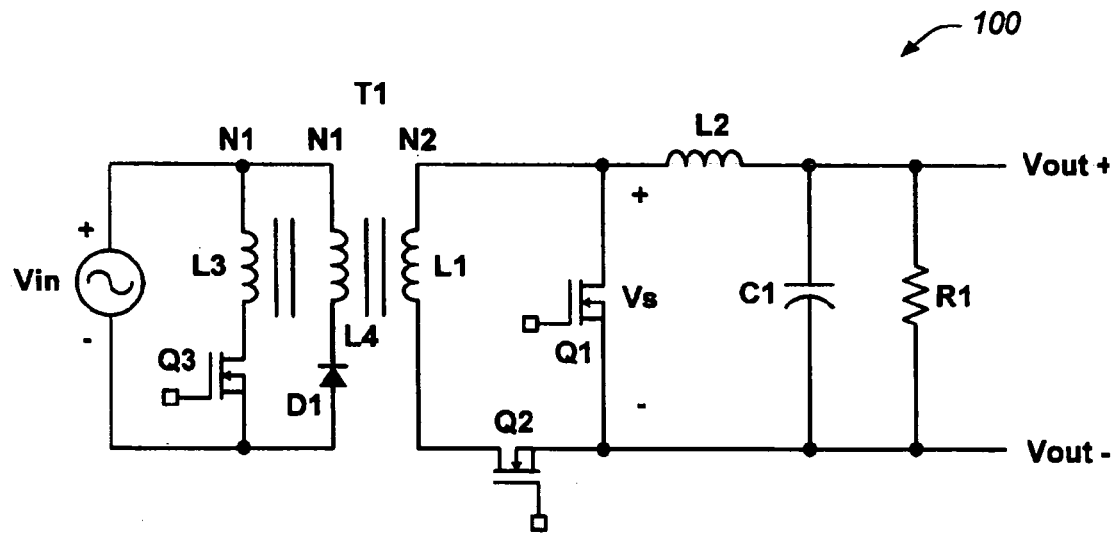
FIG._1 (PRIOR ART)
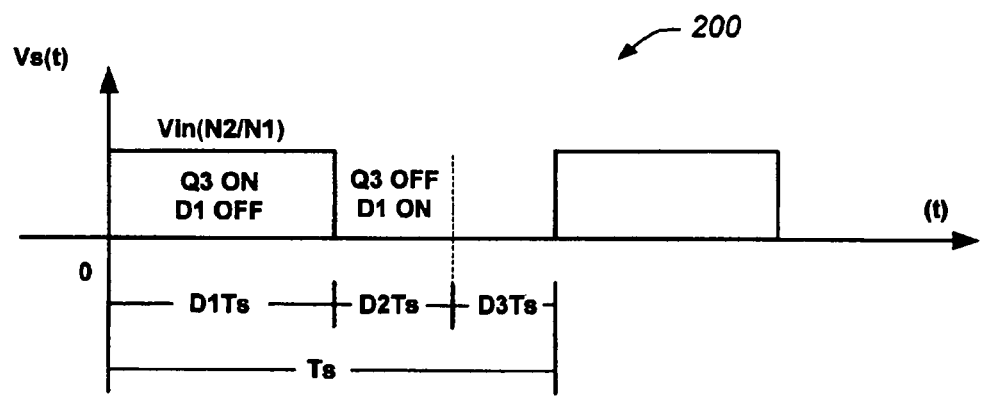
FIG._2 (PRIOR ART)

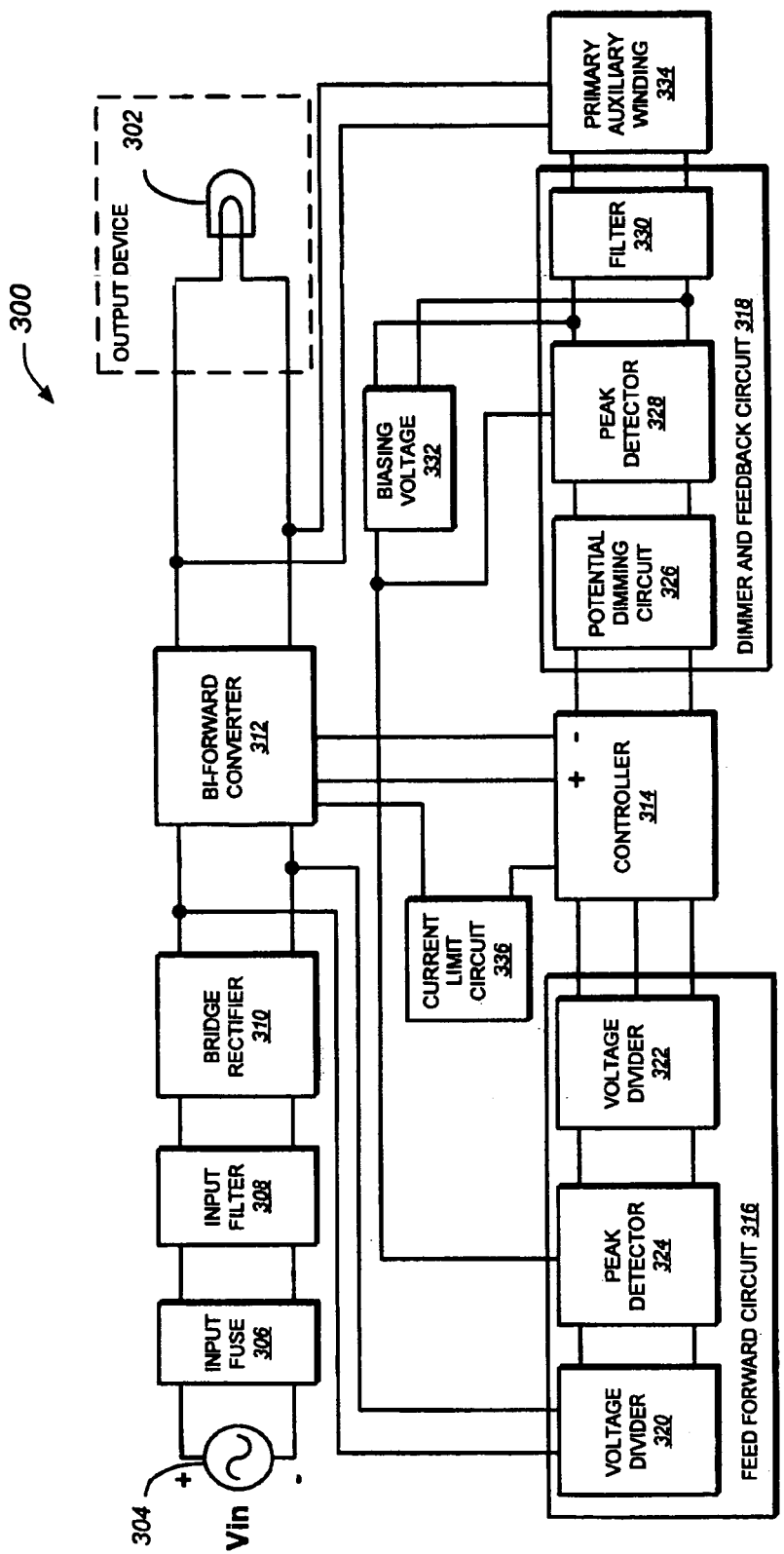
FIG._3

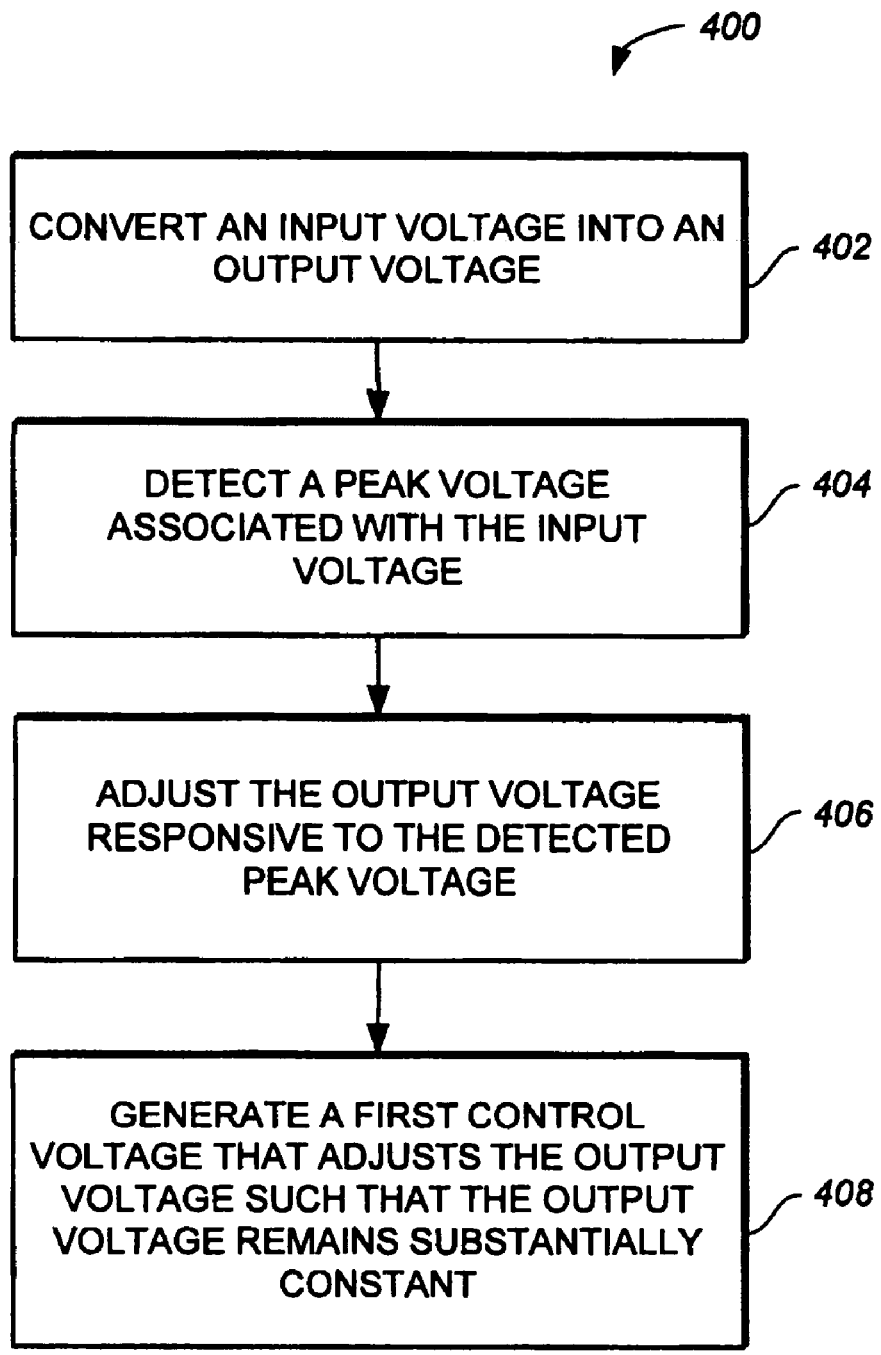
FIG._ 4

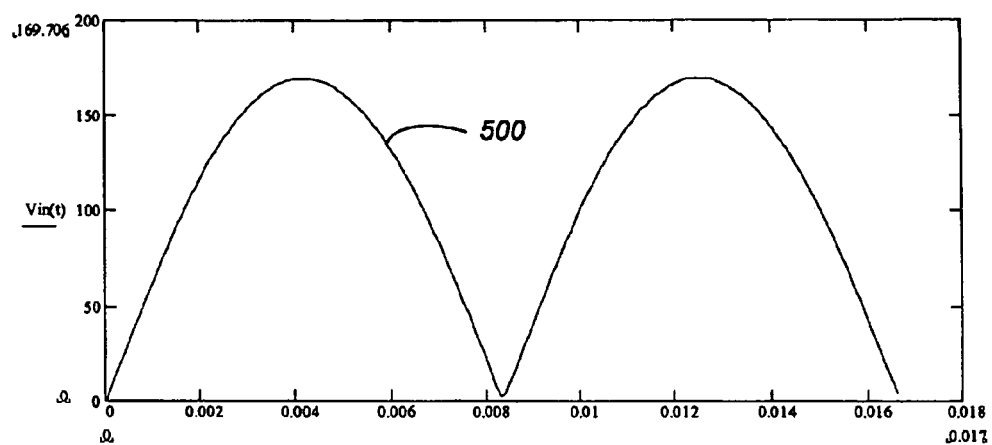
FIG._ 5
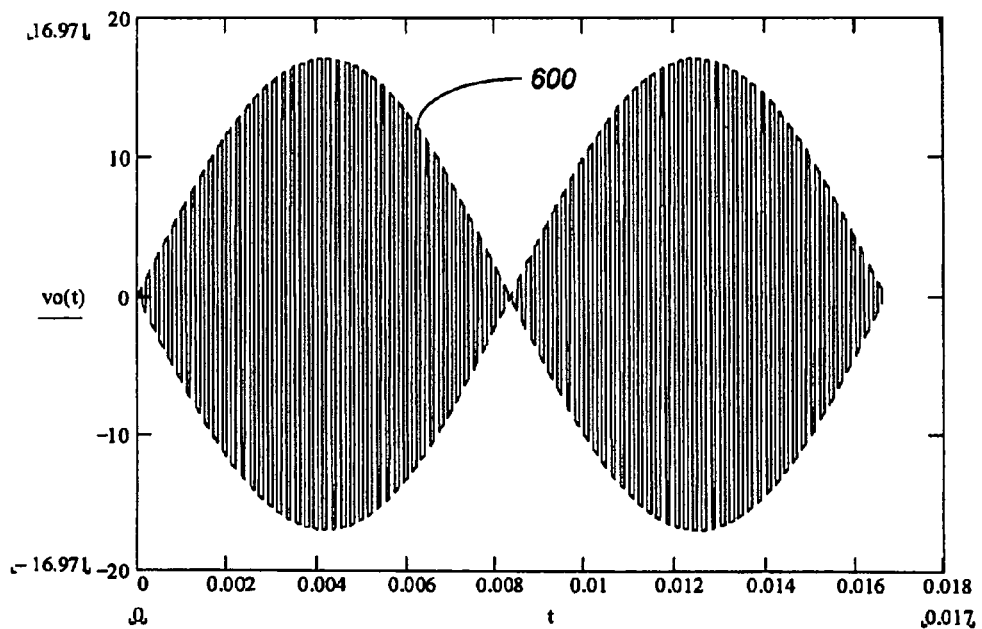
FIG._ 6

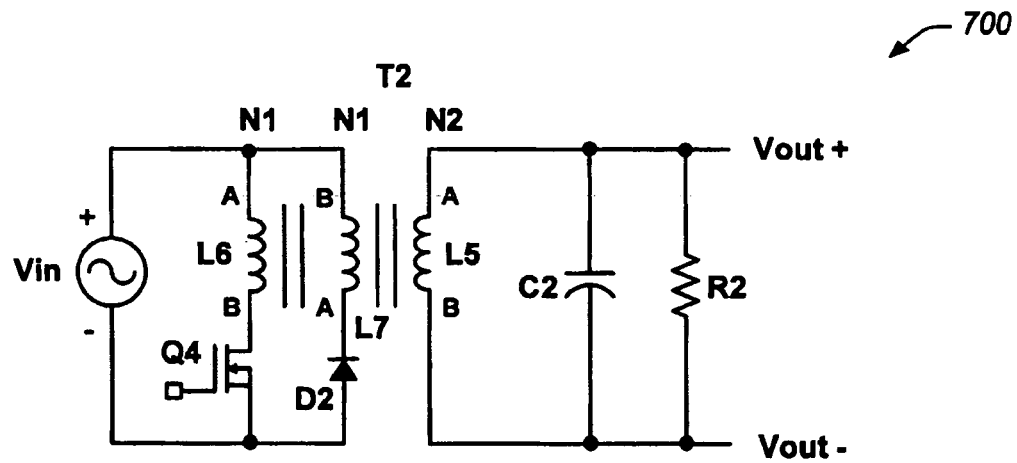
FIG._7
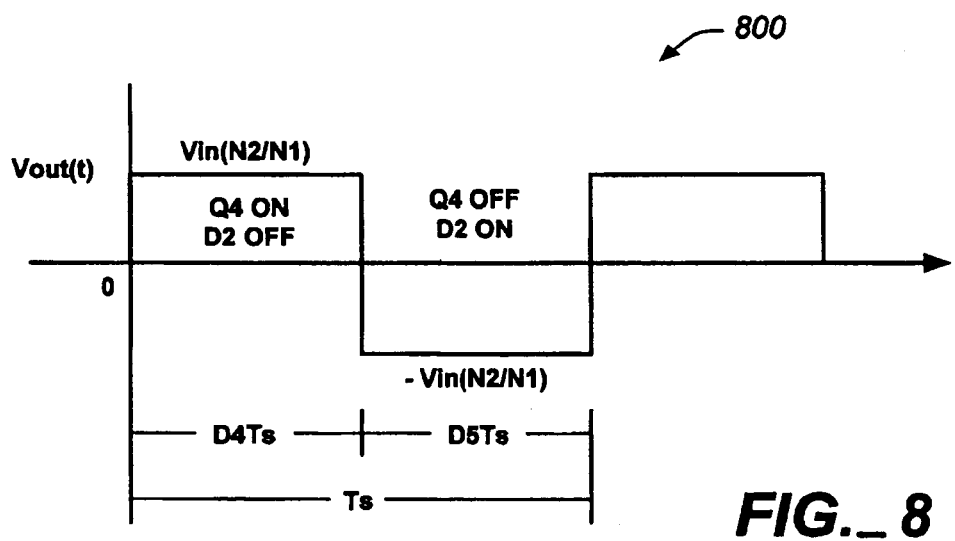
FIG._8

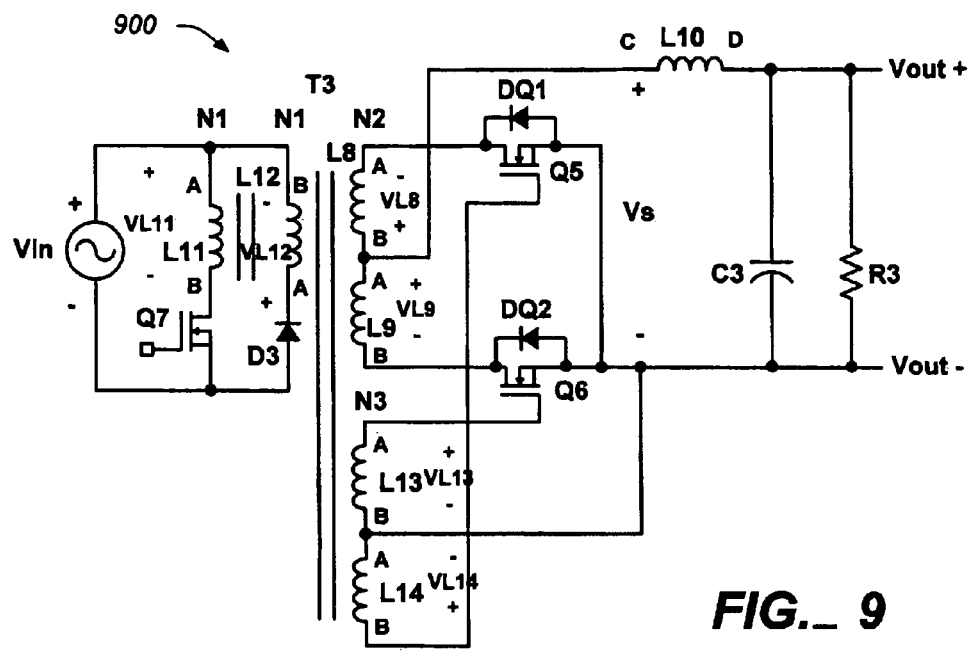
FIG._9
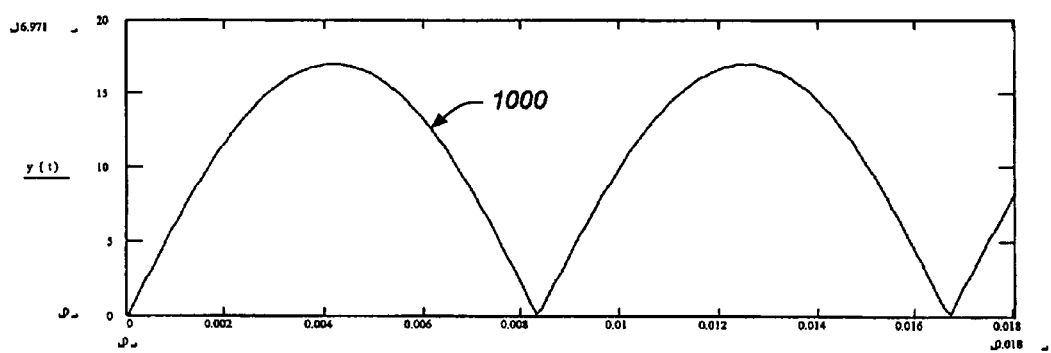
FIG._10

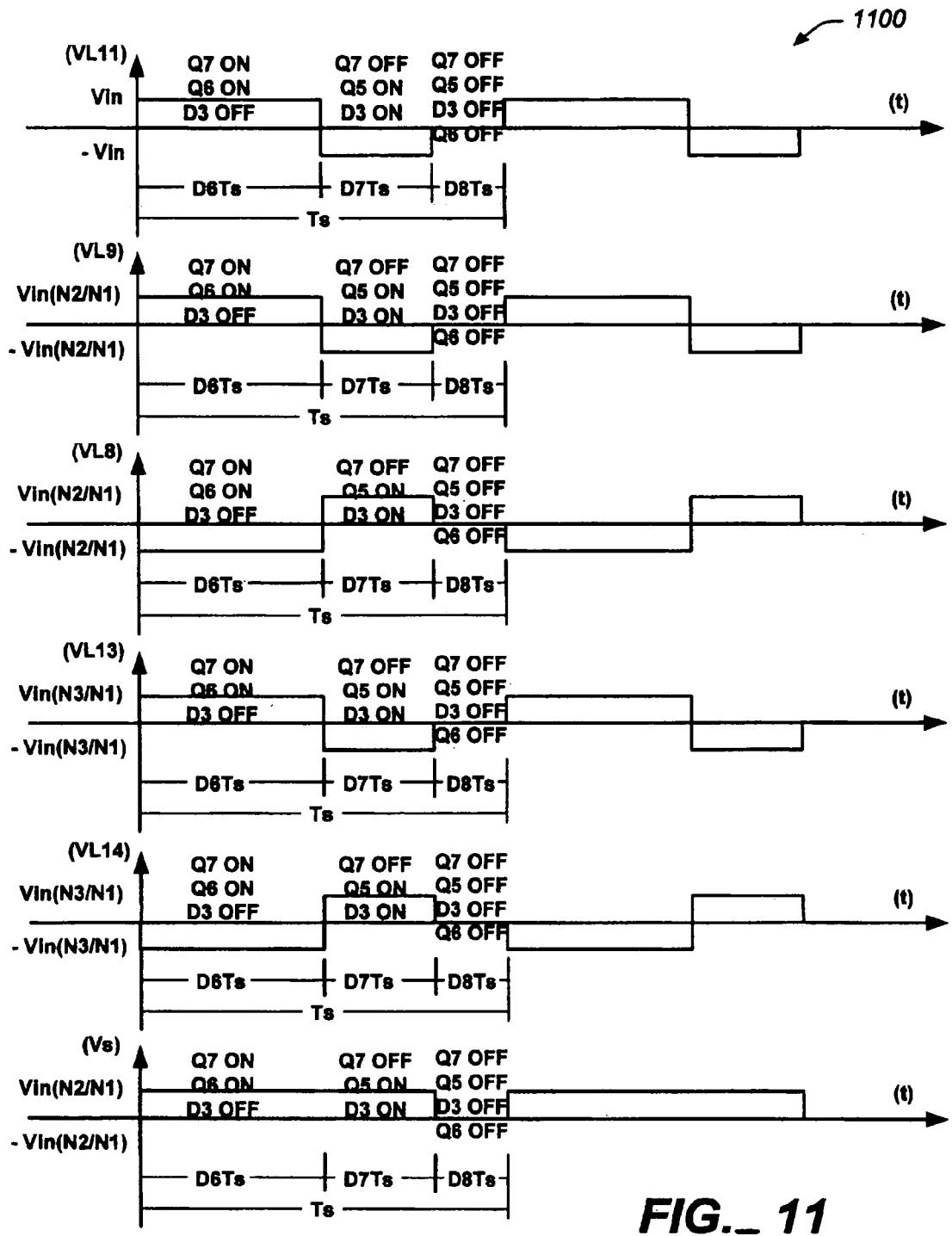
FIG._ 11

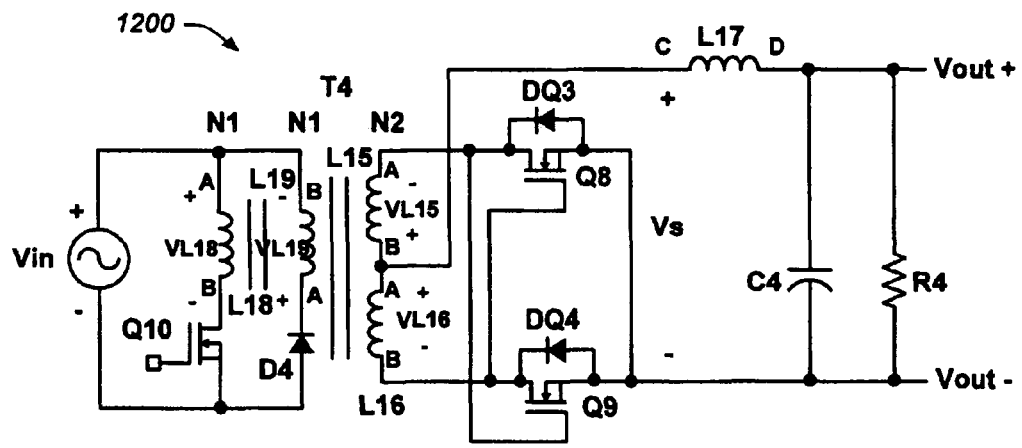
FIG._12

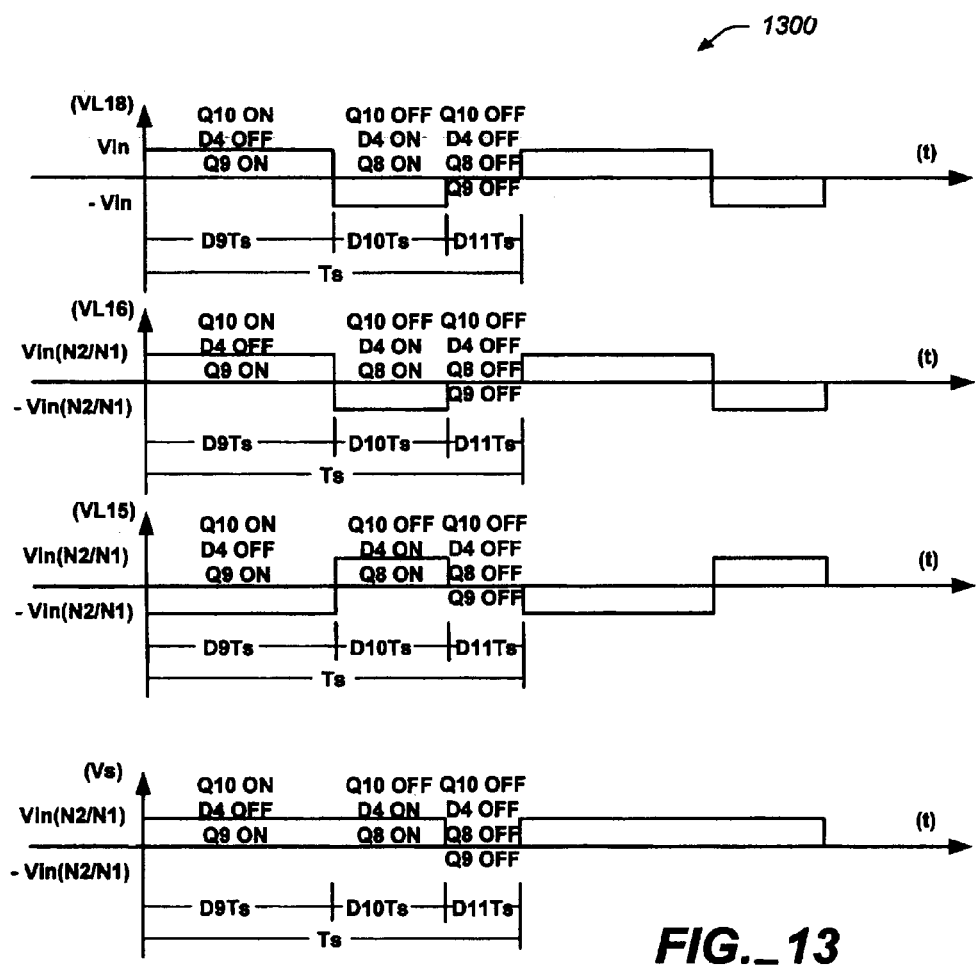
FIG._13

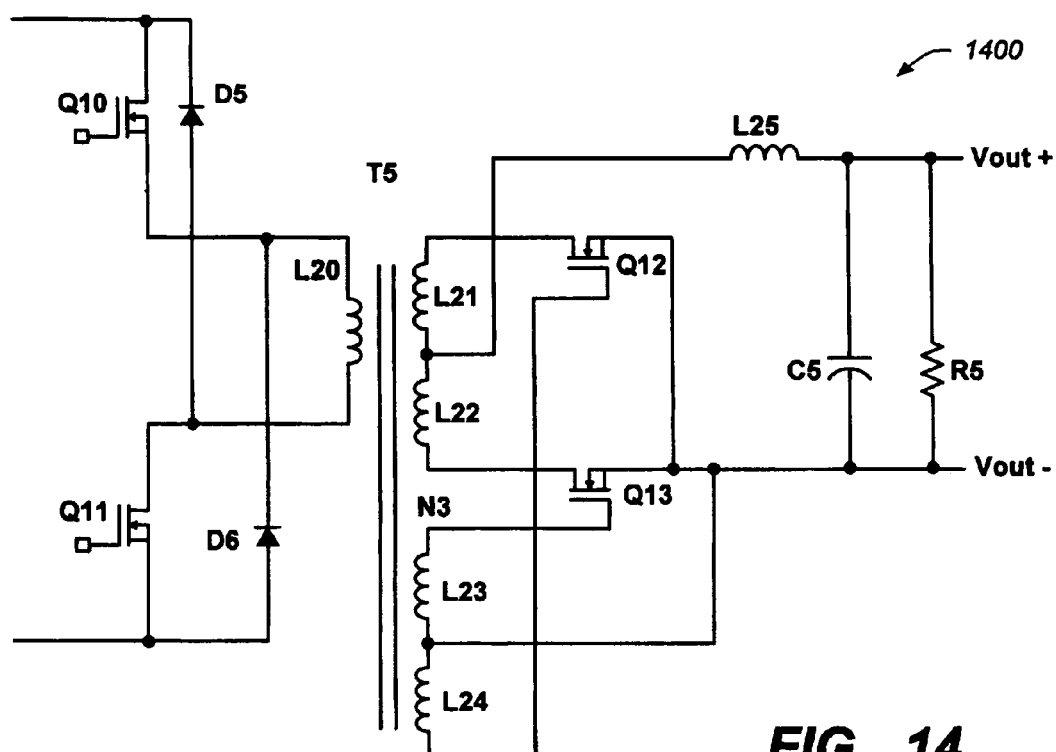
FIG._14

POWER SUPPLY SWITCHING CIRCUIT FOR A HALOGEN LAMP

CROSS-REFERENCE TO RELATED APPLICATIONS

The present application claims priority to U.S. Provisional Patent Application No. 60/540,195, filed on Jan. 29, 2004, which is incorporated herein by reference in its entirety.

BACKGROUND

The following disclosure relates to electrical circuits and signal processing.

Power supplies are used to power many types of electronic devices, for example, halogen lamps. Conventional power supplies (e.g., for halogen lamps) typically include a converter. A converter is a power supply switching circuit.

FIG. 1 shows a conventional forward converter 100 including a synchronous rectifier that receives a DC (direct current) or a rectified AC (alternating current) voltage from a power source Vin. Forward converter 100 includes transistors Q1-Q3, inductors L1-L4, a capacitor C1, a clamping diode D1, and a resistor R1. Inductors L3, L4, L1 form a transformer T1. In particular, inductors L3, L4 form primary windings (having opposite polarities) of transformer T1, and inductor L1 forms a secondary winding of transformer T1. Inductor L2 and capacitor C1 form a lowpass LC filter. In operation, during a transformer set period—e.g., when (switching) transistor Q3 turns on—a voltage on the primary windings of transformer T1 is transferred to the secondary winding of transformer T1. During a transformer reset period—e.g., when transistor Q3 turns off—clamping diode D1 turns on to return the voltage set in the secondary winding of transformer T1 to the primary windings of transformer T1.

FIG. 2 illustrates a timing diagram 200 of a voltage Vs of forward converter 100 with respect to time. Voltage Vs represents an unfiltered output voltage of forward converter 100. Ts represents one period cycle for transistor Q3. D1Ts represents a time period during which transistors Q2 and Q3 are on, while transistor Q1 and clamping diode D1 are off. D2Ts represents a time period during which clamping diode D1 and transistor Q1 are on, while transistors Q2 and Q3 are off. D3Ts represents a time period during which clamping diode D1 is off and transistors Q1, Q2, and Q3 are off. The lowpass LC filter filters the high frequency components associated with voltage Vs, and only a DC component of voltage Vs forms an output voltage Vout. As shown in FIG. 2, voltage Vs is equal to (Vin)*(N2/N1) during time period D1Ts, and is equal to zero during time periods D2Ts and D3Ts. An average value for output voltage Vout is therefore given by the following equation:

$$Vout := \left(\frac{1}{Ts}\right) \cdot \left[Vin \cdot \left(\frac{N2}{N1}\right) \cdot D1 \cdot Ts + 0 \cdot D2 \cdot Ts + 0 \cdot D3 \cdot Ts\right] \quad \text{(eq. 1)}$$

$$Vout = (Vin)*(N2/N1)*(D1),$$

where N2 represents a number of turns of the secondary winding, N1 represents a number of turns of the primary clamp windings, Vin represents the source voltage, and D1Ts represents the time period during which a switching transistor (e.g., transistor Q3) is on. As shown by equation (1), conventional forward converters typically transfer energy to a secondary winding of a transformer only during an on-time of a switching transistor (e.g., transistor Q3). Conventional forward converters, therefore, generally have a limited efficiency.

In addition to having power converters with limited efficiency, conventional power supplies (e.g., for halogen lamps) typically are not operable to control an output voltage of the power supply, e.g., for dimming control (of output voltage) or for over/under voltage protection. Consequently, if a power supply receives, e.g., a high input voltage, the power supply may pass a high output voltage to an output device (e.g., a halogen bulb), and greatly shorten the life of the output device.

SUMMARY

In general, in one aspect, this specification describes a power supply that includes a bi-forward converter, a controller, a feed forward circuit, and a dimmer and feedback circuit. The bi-forward converter is operable to convert an input voltage into an output voltage. The controller is operable to control a voltage level of the output voltage. The feed forward circuit is operable to detect a peak voltage associated with the input voltage. The dimmer and feedback circuit is operable to provide a feedback dimming control voltage to the controller. The controller is further operable to adjust the output voltage of the bi-forward converter responsive to both the peak voltage detected by the feed forward circuit and the feedback dimming control voltage provided by the dimmer and feedback circuit.

Particular implementations can include one or more of the following features. The controller can be a Pulse Width Modulation (PWM) controller operable to adjust a duty cycle of the bi-forward converter. The feed forward circuit can include a voltage divider operable to divide the input voltage, and a peak detector operable to detect a peak voltage associated with the divided input voltage and send the detected peak voltage to the controller. The dimmer and feedback circuit can include: a filter operable to filter a feedback signal associated with the output voltage of the bi-forward converter; a peak detector operable to detect a peak voltage associated with the filtered feedback signal; and a potential dimming circuit operable to generate the feedback dimming control voltage using the detected peak voltage associated with the filtered feedback signal. The potential dimming circuit can include an operational amplifier operable to compare the detected peak voltage associated with the filtered feedback signal with an adjustable voltage reference that corresponds with the output voltage of the bi-forward converter. The bi-forward converter can include a transformer having a primary winding and a secondary winding, in which the bi-forward converter is operable to transfer energy from the primary winding to the secondary winding during an on time and during an off time of a switching transistor associated with the bi-forward converter.

In general, in another aspect, the specification describes a power supply that includes a bi-forward converter and a feed forward circuit. The bi-forward converter is operable to convert an input voltage into an output voltage. The feed forward circuit is operable to detect a peak voltage associated with the input voltage, and the bi-forward converter is further operable to adjust the output voltage responsive to the peak voltage detected by the feed forward circuit.

Particular implementations can include one or more of the following features. The power supply can further include a controller operable to receive the detected peak voltage from the feed forward circuit and generate a control voltage that adjusts the output voltage such that the output voltage remains substantially constant over a wide range of detected voltage peak values. The power supply can further include a current limit circuit operable to send an error signal to the controller in an event that the power supply experiences a short circuit. The controller can be operable to shut down the bi-forward converter responsive to the error signal. The power supply can further include a full wave rectifier operable to rectify an alternating current (AC) voltage and generate the input voltage to the bi-forward converter. The full wave rectifier can be a bridge rectifier.

The bi-forward converter can include a transformer having a primary winding and a secondary winding. The bi-forward converter can be operable to transfer energy from the primary winding to the secondary winding during an on-time and during an off-time of a switching transistor associated with the bi-forward converter. The secondary winding can be composed of a first secondary winding and a second secondary winding. The second secondary winding can be operable to drive transistors associated with a secondary of the transformer. The first secondary winding and the second secondary winding can be center tapped. A secondary of the transformer can not contain any transistors. A secondary of the transformer can include one or more transistors that are driven by a voltage across the secondary winding of the transformer. The bi-forward converter can further include an LC filter operable to filter high frequency components associated with the output voltage of the bi-forward converter.

In general, in another aspect, the specification describes a method that includes, in a power supply, converting an input voltage into an output voltage; detecting a peak voltage associated with the input voltage; adjusting the output voltage responsive to the peak voltage detected by the feed forward circuit; and generating a control voltage that adjusts the output voltage such that the output voltage remains substantially constant over a wide range of detected voltage peak values.

Particular implementations can include one or more of the following features. The method can further include generating a dimming control voltage operable to control a level of the output voltage. The method can further include adjusting a duty cycle of the control voltage responsive to the feedback dimming control voltage. The method can further include rectifying an alternating current (AC) voltage to generate the input voltage.

In general, in another aspect, the specification describes a power supply that includes means for converting an input voltage into an output voltage; means for controlling a voltage level of the output voltage; means for detecting a peak voltage associated with the input voltage; and means for providing a feedback dimming control voltage to the means for controlling. The means for controlling includes means for adjusting the output voltage of the means for converting responsive to the peak voltage detected by the means for detecting and the feedback dimming control voltage.

Particular implementations can include one or more of the following features. The means for controlling can include means for adjusting a duty cycle of the means for converting in accordance with pulse width modulation. The means for detecting can include means for dividing the input voltage. The means for detecting can detect a peak voltage associated with the divided input voltage and send the detected peak voltage to the means for controlling. The means for providing can include means for filtering a feedback signal associated with the output voltage of the means for converting, and providing a filtered feedback signal; means for detecting a peak voltage associated with the filtered feedback signal; and means for generating the feedback dimming control voltage using the detected peak voltage associated with the filtered feedback signal.

The means for generating can include means for comparing the detected peak voltage associated with the filtered feedback signal with an adjustable voltage reference that corresponds with the output voltage of the means for converting. The means for converting can include transformer means having a primary winding means and a secondary winding means. The means for converting can further include means for transferring energy from the primary winding means to the secondary winding means during an on time and during an off time of a switching transistor means associated with the means for converting.

In general, in another aspect, the specification describes a power supply that includes means for converting an input voltage into an output voltage, and means for detecting a peak voltage associated with the input voltage. The means for converting further includes means for adjusting the output voltage responsive to the peak voltage detected by the means for detecting a peak voltage.

Particular implementations can include one or more of the following features. The power supply can further include means for receiving the detected peak voltage from means for detecting, and generating a controller control voltage that adjusts the output voltage such that the output voltage remains substantially constant over a wide range of detected voltage peak values. The means for generating a controller control voltage can include a Pulse Width Modulation (PWM) controller means. The power supply can further include means for generating a feedback dimming control voltage responsive to the output voltage of the means for converting, and providing the feedback dimming control voltage to the means for generating a controller control voltage. The means for generating a controller control voltage can be operable to control a level of the output voltage of the means for converting responsive to the feedback dimming control voltage.

The means for generating a controller control voltage can include means for adjusting a duty cycle of the controller control voltage responsive to the feedback dimming control voltage. The means for generating a feedback dimming control voltage can include: means for filtering a feedback signal associated with the output voltage of the means for converting, and producing a filtered feedback signal; means for detecting a peak voltage associated with the filtered feedback signal; and means for generating the feedback dimming control voltage using the detected peak voltage associated with the filtered feedback signal. The means for detecting a peak voltage can include means for dividing the input voltage. The means for detecting a peak voltage can include means for detecting a peak voltage associated with the divided input voltage and sending the detected peak voltage to the means for generating a controller control voltage.

The power supply can further include means for sending an error signal to the means for generating a controller control voltage in an event that the power supply exceeds a predetermined current limit. The means for generating a controller control voltage can include means for shutting down the means for converting responsive to the error signal. The power supply can further include means for rectifying an alternating current (AC) voltage and generating the input voltage to the means for converting. The means for rectifying can include bridge rectifier means. The means for converting can include transformer means having primary winding means and secondary winding means. The converting means can include means for transferring energy from the primary winding means to the secondary winding means during an on time and during an off time of a switching transistor means associated with the means for converting.

The secondary winding means can include a first secondary winding means and a second secondary winding means. The second secondary winding means can be operable to drive transistor means associated with a secondary means of the transformer means. The first secondary winding means and the second secondary winding means can be each center tapped. A secondary means of the transformer means can not contain any transistor means. A secondary means of the transformer means can include one or more transistor means that are driven by a voltage across the secondary winding means of the transformer means. The means for converting can further include means for filtering high frequency components associated with the output voltage of the means for converting.

Implementations can include one or more of the following advantages. A power supply circuit is provided that includes a feed forward circuit operable to maintain an output of a bi-forward converter at substantially a constant level over a range of input voltages to the power supply circuit. The power supply also includes a dimmer circuit operable to dim a connected device (e.g., a halogen lamp) through a feedback control voltage. In one implementation, the feed forward circuit and the dimmer circuit are implemented on a same printed circuit board (PCB) to reduce size and cost of the power supply.

In one implementation, a bi-forward converter is provided that can transfer energy to a secondary winding of a transformer during set and reset periods of the transformer, thus increasing an efficiency of the power supply.

The details of one or more implementations are set forth in the accompanying drawings and the description below. Other features and advantages will be apparent from the description and drawings, and from the claims.

DESCRIPTION OF DRAWINGS

FIG. 1 is a schematic diagram of a conventional forward converter including a synchronous rectifier.

FIG. 2 is timing diagram of a voltage Vs of the forward converter of FIG. 1.

FIG. 3 is a block diagram of a power supply.

FIG. 4 is a method for operating the power supply of FIG. 3.

FIG. 5 is a timing diagram of a output voltage from a bridge rectifier in the power supply of FIG. 3.

FIG. 6 illustrates an envelope of an output voltage of a bi-forward converter.

FIG. 7 is a schematic diagram of a bi-forward converter in the power supply of FIG. 3.

FIG. 8 is timing diagram of an output voltage Vout of the bi-forward converter of FIG. 7.

FIG. 9 is a schematic diagram of an alternative configuration of a bi-forward converter in the power supply of FIG. 3.

FIG. 10 is a timing diagram of a output voltage of a bi-forward converter.

FIG. 11 is timing diagram including a voltage Vs of the bi-forward converter of FIG. 9.

FIG. 12 is a schematic diagram of an alternative configuration of a bi-forward converter in the power supply of FIG. 3.

FIG. 13 is timing diagram including a voltage Vs of the bi-forward converter of FIG. 12.

FIG. 14 is a schematic diagram of two-transistor converter circuit.

Like reference symbols in the various drawings indicate like elements.

DETAILED DESCRIPTION

FIG. 3 is a block diagram of a power supply 300 for a connected output device (e.g., halogen lamp 302). In one implementation, power supply 300 receives an input AC (alternating current) source voltage from a voltage source 304. Voltage source 304 can provide, for example, a 60 Hz 110 volt AC sinusoidal voltage. In one implementation, power supply 300 includes an input fuse 306, an input filter 308, a bridge rectifier 310, a bi-forward converter 312, a controller 314, a feed forward circuit 316, a dimmer and feedback circuit 318, a biasing voltage 332, a primary auxiliary winding 334, and a current limit circuit 336.

Input fuse 306 provides input current protection for bi-forward converter 312. In particular, in one implementation, input fuse 306 is designed to provide current protection for bi-forward converter 312 by cutting off current flow to bi-forward converter 312 in an event that current being drawn through input fuse 306 exceeds a predetermined design rating. For example, input fuse 306 can melt to isolate bi-forward converter 312 from voltage source 304 if current drawn through input fuse 306 is larger than a pre-determined value.

Input filter 308 minimizes an effect of electromagnetic interference (EMI) on power supply 300 and any exterior power system components. Input filter 308 can be an LC filter or a π (pi) filter that provide a low impedance path for high-frequency noise to protect power supply 300 and exterior power system components from EMI.

Bridge rectifier 310 converts the input AC source voltage from voltage source 304 into a substantially DC (direct current) voltage, as shown in FIG. 5. In one implementation, bridge rectifier 310 is a full-wave rectifier that includes, e.g., four rectifiers in a bridge configuration.

Bi-forward converter 312 converts the substantially DC voltage received from bridge rectifier 310 into a substantially DC output voltage having a predetermined rms (root mean square) value suitable to support an output device (e.g., halogen lamp 302). For example, a bi-forward converter (e.g., bi-forward converter 700 which is discussed in greater detail below) can provided a substantially AC output voltage having an envelope 600, as shown in FIG. 6. In one implementation, envelop 600 includes high frequency pulses with a 60 Hz sinusoidal boundary. In one implementation, bi-forward converter 312 converts the substantially DC voltage received from bridge rectifier 310 into a DC voltage having a value of substantially (12) volts. In one implementation, bi-forward converter 312 is in a form of a buck converter topology.

Controller 314 is operable to control an output voltage level of bi-forward converter 312. In one implementation, controller 314 is a Pulse Width Modulation (PWM) controller. In such an implementation, controller 314 is operable to adjust a duty cycle of bi-forward converter 312 so that bi-forward converter 312 outputs a substantially DC output voltage having a predetermined rms voltage value. Controller 314 can also be a linear control type controller. Controller 314 can control an output voltage level of bi-forward converter 312 responsive to a voltage value set by a feedback control voltage from dimmer and feedback circuit 318, as discussed in greater detail below. In one implementation, a wire length between the secondary output of a transformer (in bi-forward converter 312) and output device is as short as possible.

Feed forward circuit 316 generally detects a peak voltage associated with the input AC rms source voltage from bridge rectifier 310 and sends the detected peak voltage to controller 314. Controller 314 is operable to receive the detected peak voltage from feed forward circuit 316 and adjust a voltage output of bi-forward converter 312 such that bi-forward converter 312 outputs a substantially constant rms voltage to an output device (e.g., halogen lamp 302) over a wide range of detected voltage peak values. In an implementation in which controller 314 is a PWM controller, controller 314 is operable to adjust a duty cycle of bi-forward converter 312 so that bi-forward converter 312 outputs a substantially constant rms voltage. For example, in one implementation, if feed forward circuit 316 detects a peak nominal voltage of the input source voltage being near 90 volts, then controller 314 is operable to increase a duty cycle of bi-forward converter 312 to boost an output voltage level of bi-forward converter 312. And if feed forward circuit 316 detects a peak nominal voltage of the input source voltage being near 150 volts, then controller 314 is operable to decrease a duty cycle of bi-forward converter 312 to lower an output voltage level of bi-forward converter 312. Output voltage Vout of bi-forward converter can, therefore, maintain a relatively constant rms voltage.

In one implementation, feed forward circuit 316 includes voltage dividers 320, 322 and a peak detector 324. Voltage divider 320 is operable to divide a voltage output from bridge rectifier 310 and send the divided voltage to peak detector 324. Peak detector 324 receives the divided voltage from voltage divider 320 and detects a peak voltage associated with the divided voltage. The detected peak voltage is passed to controller 314. Voltage divider 322 is operable to divide the detected peak voltage into (2) control voltages for over/under voltage protection. The (2) control voltages are provided to controller 314. For example, if a detected peak voltage is substantially above (150) volts or substantially below (90) volts, controller 314 is operable to shut down bi-forward converter 312.

Dimmer and feedback circuit 318 is operable to generally provide a feedback dimming control voltage to controller 314 for dimming (or reducing) voltage to an output device (e.g., halogen lamp 302). In one implementation, controller 314 adjusts a duty cycle of bi-forward converter 312 responsive to the feedback dimming control voltage from dimmer and feedback circuit 318. A decrease in the duty cycle of bi-forward converter 312 will cause a decrease in an output voltage level of bi-forward converter 312. Likewise, an increase in the duty cycle of bi-forward converter 312 will cause an increase in the output voltage level of bi-forward converter 312.

Dimmer and feedback circuit 318 provides a feedback function as follows. Potential dimming circuit 326 can include an operational amplifier (not shown) having two inputs. The first input, a non-inverse input(+), can be received from an adjustable voltage reference and the second input, an inverse input(−), can be received from peak detector 328 that represents an rms voltage of output voltage Vout. A duty cycle range is related to the adjustable voltage reference. In one implementation, the adjustable voltage reference is reduced to a predetermined value corresponding to an rms value associated with an output voltage Vout (of bi-forward converter 312). If the rms output voltage is higher than the predetermined value, a feedback voltage value on the inverse input (−) will be higher relative to the non-inverse input (+), and the controller 314 will reduce the duty cycle of bi-forward converter 312. An output voltage level of bi-forward converter 312 will lower until an rms output voltage value of output voltage Vout substantially equals the predetermined value. Also, if the rms output voltage is lower than the predetermined value, a feedback voltage value on the inverse input (−) will be lower relative to the non-inverse input (+), and the controller 314 will increase the duty cycle of bi-forward converter 312. An output voltage level of bi-forward converter 312 will increase until an rms output voltage value of output voltage Vout substantially equals the predetermined value.

In one implementation, dimmer and feedback circuit 318 includes potential dimming circuit 326, a peak detector 328 and a filter 330. A primary auxiliary winding 334 is in communication with an output of bi-forward converter 312, and provides a feedback signal to dimmer and feedback circuit 318. The feedback signal represents a voltage level of the output of bi-forward converter 312. Filter 330 filters (e.g., high frequency components associated with) the feedback signal and provides a filtered signal to peak detector 328. Peak detector 328 detects a peak voltage associated with the filtered signal and provides the detected peak voltage of the filtered signal to potential dimming circuit 326. Potential dimming circuit 326 is operable to generate and send a feedback dimming control voltage to controller 314 using the detected peak voltage of the filtered signal.

Power supply 300 can include a current limit circuit 336. Current limit circuit 336 is operable to limit current in bi-forward converter 312 in an event that power supply 300 experiences a short circuit. In one implementation, current limit circuit 336 sends an error signal to controller 314, and in response, controller 314 shuts down bi-forward converter 312.

Power supply 300 can further include a biasing voltage 332 that supplies a reference voltage to peak detectors 324, 328, potential dimming circuit 326, and controller 314. In one implementation, biasing voltage 332 generates a reference voltage using the filtered signal output of filter 330. The supply voltage can be substantially equal to 12 volts. Before bi-forward convert 312 becomes operational, a linear regulator (not shown) including a zener diode can supply the reference voltage. After bi-forward converter 312 becomes operational, an auxiliary winding coupled after filter 330 and the zener diode can supply the reference voltage.

FIG. 4 shows a process 400 for generating an output voltage in a power supply (e.g., power supply 300). An input voltage is converted into an output voltage (e.g., using bi-forward converter 312) (step 402). In one implementation, the input voltage is a substantially DC voltage. A peak voltage associated with the input voltage is detected (e.g., using feed forward circuit 316) (step 404). The output voltage is adjusted (e.g., using controller 314) using the detected peak voltage (step 406). A first control voltage is generated (e.g., through controller 314) that adjusts the output voltage such that the output voltage remains substantially constant (step 408). In one implementation, the output voltage remains substantially constant over a wide range of detected peak voltages.

FIG. 7 illustrates one implementation of a bi-forward converter that can be used within power supply 300. Referring to FIG. 7, a bi-forward converter 700 is shown that includes a (switching) transistor Q4, inductors L5-L7, a clamping diode D2, a capacitor C2, and a resistor R2. Unlike a conventional bi-forward converter including a synchronous rectifier that may include a secondary having one or more transistors, bi-forward converter 700 includes a secondary that does not contain a transistor.

A first node of inductor L6 is in communication with a first node of a power source Vin and a first node of inductor L7. A second node of inductor L6 is in communication with a drain of transistor Q4. A second node of inductor L7 is in communication with a cathode of clamping diode D2. An anode of clamping diode D2 is in communication with a source of transistor Q4 and a second node of power source Vin. A first node of inductor L5 is in communication with a first node of capacitor C2 and a first node of resistor R2. A second node of inductor L5 is in communication with a second node of capacitor C2 and a second node of resistor R2. The first and second nodes of resistor R2 respectively form positive and negative outputs Vout+, Vout− of bi-forward converter 700.

Inductors L5-L7 form a transformer T2. More specifically, inductors L6, L7 form primary windings of transformer T2, and inductor L5 forms a secondary winding of transformer T2. Bi-forward converter 700 receives a substantially DC voltage (e.g., a rectified AC voltage) from power source Vin.

In operation, during a transformer set period (D4Ts, shown in FIG. 8)—e.g., when (switching) transistor Q4 turns on, the nodes for each of the respective windings that are designated with an "A" are positive with respect to nodes designated with a "B". The voltage at node "A" of inductor L7 is positive with respect to ground, and clamping diode D2 turns off. Current flows from node "A" of inductor L5 to Vout+, through capacitor C2 and resistor R2, to Vout− and then returns back to node "B" of inductor L5. Consequently, a voltage on the primary windings of transformer T2 is transferred to the secondary winding of transformer T2.

During a transformer reset period (D5Ts, shown in FIG. 8)—e.g., when transistor Q4 turns off—the polarity of voltages across all winding are reversed with respect to a transformer set period. That is, the voltage on nodes that are designated with an "A" for each of the respective windings is negative with respect to the voltage on nodes that are designated with a "B". Clamping diode D2 turns on (the voltage on node "A" of inductor L7 is negative with respect to ground) to reset transformer T2. Current flows out of node "B" of inductor L5 to Vout−, through capacitor C2 and resistor R2, to Vout+ and returns to node "A" of inductor L5. As during a transformer set period, energy (or voltage) is transferred from primary to secondary during the period when transistor Q4 turns off. Energy is, therefore, transferred from primary to secondary during both set and reset periods of transformer T2. In one implementation, a switching frequency for transistor Q4 is substantially less than or equal to 50 kHz.

FIG. 8 illustrates a timing diagram 800 of an output voltage Vout of bi-forward converter 700 with respect to time. Ts represents one duty cycle for transistor Q4. D4Ts represents a time period during which transistor Q4 is on and clamping diode D2 is off (i.e., a transformer set period). D5Ts represents a time period during which clamping diode D2 is on and transistor Q4 is off (i.e., a transformer reset period). As shown in FIG. 8, output voltage Vout (rms) is equal to $$\text{Rms\_Vout} := \sqrt{\left(\frac{1}{T_s}\right) \cdot \left[\left[Vin \cdot \left(\frac{N2}{N1}\right)\right]^2 \cdot D_4 \cdot T_s + \left[-Vin \cdot \left(\frac{N2}{N1}\right)\right]^2 \cdot D_5 \cdot T_s\right]} \quad \text{(eq. 2)}$$

rms $Vout = (Vin) * (N2/N1)$, where $D_4 + D_5 = 1$ during time period D4Ts, and is equal to $$\text{rms } Vout = (-Vin)*(N2/N1) \quad \text{(eq. 3)}$$

during time period D5Ts. N1 represents a number of turns of the primary windings of transformer T2, and N2 represents a number of turns of the secondary winding of transformer T2. Bi-forward converter 700 is therefore operable to transfer energy—i.e., (−Vin)*(N2/N1)—to the secondary winding of transformer T2 during the time that (switching) transistor Q4 is off, unlike a conventional forward converter that can typically only transfer energy during the time that transistor Q4 is on (i.e., a transformer set period).

FIG. 9 illustrates an alternative implementation of a bi-forward converter that can be used within power supply 300. As shown in FIG. 9, a bi-forward converter 900 includes transistors Q5-Q7, inductors L8-L14, a clamping diode D3, a capacitor C3, and a resistor R3. Associated with transistors Q5, Q6 are body diodes DQ1, DQ2, respectively. Inductor L10 and capacitor C3 form a lowpass LC filter. Resistor R3 operates as a load resistor. In one implementation, a switching frequency for bi-forward converter 900 is substantially greater than 100 kHz. The LC filter within bi-forward converter 900 eliminates high frequency components within the output voltage Vout. Output voltage Vout of bi-forward converter 900 has substantially the same frequency as input voltage Vin. For example, if input voltage Vin is substantially a 120 Hz DC voltage, then output voltage Vout will be a 120 Hz DC voltage. And if input voltage Vin is a constant DC voltage, then output voltage Vout will be a constant DC voltage. In one implementation, bi-forward converter 900 outputs an output voltage 1000 (shown in FIG. 10) having a predetermined rms (root mean square) value suitable to support an output device (e.g., halogen lamp 302).

A first node of inductor L11 is in communication with a first node of a power source Vin and a first node of inductor L12. A second node of inductor L11 is in communication with a drain of transistor Q7. A second node of inductor L12 is in communication with a cathode of clamping diode D3. An anode of clamping diode D3 is in communication with a source of transistor Q7 and a second node of power source Vin. A first node of inductor L8 is in communication with a cathode of body diode DQ1 and a drain of transistor Q5. A second node of inductor L8 is in communication with a first node of inductor L10 and a first node of inductor L9. A second node of inductor L9 is in communication with a cathode of body diode DQ2 and a drain of transistor Q6. A first node of inductor L13 is in communication with a gate of transistor Q6. A second node of inductor L13 is in communication with a first node of inductor L14. A second node of inductor L14 is in communication with a gate of transistor Q5. The second node of inductor L10 is in communication with a first node of capacitor C3 and a first node of resistor R3. The second node of inductor L13 is further in communication with anodes of body diodes DQ1, DQ2, sources of transistors Q5, Q6, a second node of capacitor C3, and a second node of resistor R3. The first and second nodes of resistor R3 respectively form positive and negative outputs Vout+, Vout− of bi-forward converter 900.

Inductors L11, L12, L8, L9, L13, L14 form a transformer T3. Inductors L11, L12 form primary windings of transformer T3. Inductors L8, L9 form a first center-tapped secondary winding of transformer T3, and inductors L13, L14 form a second center-tapped secondary winding of transformer T3. In one implementation, the second center-tapped secondary winding of transformer T3 has a lower number of turns (N3) relative to a number of turns associated with the first center-tapped secondary winding of transformer T3. The second center-tapped secondary winding of transformer T3 provides voltages to drive transistors Q5, Q6. In one implementation, the number of turns N3 is selected to such that a Vgs (gate-to-source voltage) of transistors Q5, Q6 are less than 20 volts. If both the voltage on node "A" of inductor L8 and the voltage on node "B" of inductor L9 are larger than 20 volts, the second center-tapped secondary winding is necessary, otherwise the second center-tapped secondary winding can be removed (as shown in FIG. 12 and discussed in greater detail below).

Bi-forward converter 900 receives a substantially DC voltage (e.g., a rectified AC voltage) from power source Vin. In operation, during a transformer set period (D6Ts, shown in FIG. 11)—e.g., when (switching) transistor Q7 turns on, nodes that are designated with an "A" for each of inductors L8, L9, L11, L12, L13, L14 are positive with respect to nodes that are designated with a "B". Clamping diode D3 turns off due to node "A" of inductor L12 having a voltage substantially greater than ground. Transistor Q5 turns off as a voltage VL14 (i.e., the voltage across inductor L14) is negative. Transistor Q6 turns on as a voltage VL13 (i.e., the voltage across inductor L13) is positive. A voltage VL9 (i.e., the voltage across inductor L9) is positive and, therefore, causes current to flow from node "A" of inductor L9 through inductor L10, Vout+, capacitor C3 and resistor R3, Vout−, transistor Q6 and back to node "B" of inductor L9. A voltage on node "C" of inductor L10 is higher than a voltage on node "D" of inductor L10. A voltage on the primary windings of transformer T3 is transferred to the secondary winding of transformer T3 during the transformer set period.

During a transformer reset period (D7Ts, shown in FIG. 11)—e.g., when transistor Q7 turns off—the polarity of voltages across all windings are reversed relative to when the transformer is in a set period. That is, the voltage on node "A" of each of the respective inductors L8, L9, L11, L12, L13, L14 are negative respective to the voltage on node "B". Clamping diode D3 turns on to reset transformer T3 as the voltage on node "A" of inductor L12 is negative. Transistor Q5 turns on as voltage VL14 is positive, and transistor Q6 turns off as voltage VL13 is negative. Voltage VL8 (i.e., the voltage across inductor L8) is positive and, therefore, causes current to flow from node "B" of inductor L8, through inductor L10, Vout+, capacitor C3 and resistor R3, Vout−, transistor Q5 and back to node "A" of inductor L8. A voltage on node "C" of inductor L10 is higher than a voltage on node "D" of inductor L10. In one implementation, a switching frequency for transistor Q7 is substantially greater than or equal to 50 kHz.

During a transformer freewheeling period (D8Ts shown in FIG. 11) the voltage across all inductors L8, L9, L11, L12, L13, L14 become zero. The freewheeling period is a time during which energy saved in inductor L10 sustains a load current. The polarity of the voltage across inductor L10 changes direction. Node "C" of inductor L10 becomes negative with respect to node "D". Body diodes DQ1 and DQ2 turn on. Current flows from the node "D" of inductor L10 to Vout+, through capacitor C3 and resistor R3, Vout−, body diodes DQ1 and DQ2, respectively, inductors L8 and L9, respectively, then merges at the center tap point (between inductors L8 and L9), and back to node "C" of inductor L10.

FIG. 11 illustrates a timing diagram 1100 of a voltage Vs of bi-forward converter 900 with respect to time. Timing diagram 1100 also illustrates voltages VL11, VL9, VL8, VL13, VL14 that represent voltages across inductors L11, L9, L8, L13, L14, respectively. Ts represents one period cycle for transistor Q7. D6Ts represents a time period during which transistor Q7 is on and clamping diode D3 is off (transistor Q5 is off and transistor Q6 is on). D7Ts represents a time period during which clamping diode D3 is on and transistor Q7 is off (transistor Q5 is on and transistor Q6 is off). D8Ts represents a time period during which clamping diode D3 is off and transistor Q7 is off (transistor Q5 is off and transistor Q6 is off). As shown in FIG. 11, voltage Vs of bi-forward converter 900 is equal to $$Vs = (Vin)*(N2/N1) \quad \text{(eq. 4)}$$

during time periods D6Ts and D7Ts, and is equal to zero during time period D8Ts. The LC filter (formed by inductor L10 and capacitor C3) within bi-forward converter 900 removes all harmonics associated with voltage Vs and only a DC component of Vs is transferred as an output voltage Vout. From a Fourier transformation, the DC component of Vs (i.e., Vout) can be computed as the average value of Vs. An average value for voltage Vs of bi-forward converter 900 is therefore given by the following equation:

$$rms\ Vout = avg\ Vs = (1/Ts)*\{[Vin*(N2/N1)*D6Ts] + [Vin*(N2/N1)*D7Ts] + [0*(N2/N1)*D8Ts]\}$$

$$rms\ Vout = Vin*(N2/N1)*(D6+D7) \quad \text{(eq. 5)}$$

where N2 represents a number of turns of the first center-tapped secondary winding of transformer T3, N1 represents a number of turns of the primary windings of transformer T3, Vin represents the source voltage, D6Ts represents the time period during which a switching transistor (e.g., transistor Q7) is on and clamping diode D3 is off (transistor Q5 is off and transistor Q6 is on), and D7Ts represents the time period during which the switching transistor (e.g., transistor Q7) is off and clamping diode D3 is on (transistor Q5 is on and transistor Q6 is off). As shown by equation (5), bi-forward converter 900 is operable to transfer energy to first secondary winding of a transformer T3 during an on-time and off-time of a switching transistor (e.g., transistor Q7).

If a voltage on node "A" of inductor L8 and a voltage of node "B" of inductor L9 are less than 20 volts, in one implementation, the second secondary center-tapped winding can be removed. The first center-tapped secondary winding can be used drive the secondary MOSFETs (e.g., transistors Q8, Q9, shown in FIG. 12) while the secondary MOSFETs transfer energy from the primary to the secondary.

FIG. 12 illustrates such an implementation of a bi-forward converter that can be used within power supply 300. As shown in FIG. 12, a bi-forward converter 1200 includes transistors Q8-Q10, inductors L15-L19, a clamping diode D4, a capacitor C4, and a resistor R4. Associated with transistors Q8, Q9 are body diodes DQ3, DQ4, respectively. Inductor L17 and capacitor C4 form a lowpass LC filter. Bi-forward converter 1200 can also output an output voltage 1000 (shown in FIG. 10) having a predetermined rms (root mean square) value suitable to support an output device (e.g., halogen lamp 302).

A first node of inductor L18 is in communication with a first node of a power source Vin and a first node of inductor L19. A second node of inductor L18 is in communication with a drain of transistor Q10. A second node of inductor L19 is in communication with a cathode of clamping diode D4. An anode of clamping diode D4 is in communication with a source of transistor Q10 and a second node of power source Vin. A first node of inductor L15 is in communication with a cathode of body diode DQ3, a drain of transistor Q8, and a gate of transistor Q9. A second node of inductor L15 is in communication with a first node of inductor L16 and a first node of inductor L17. A second node of inductor L16 is in communication with a cathode of body diode DQ4, a drain of transistor Q9, and a gate of transistor Q8. The second node of inductor L17 is in communication with a first node of capacitor C4 and a first node of resistor R4. The source of transistor Q8 is in communication with anodes of body diodes DQ3, DQ4, a source of transistors Q9, Q6, a second node of capacitor C4, and a second node of resistor R4. The first and second nodes of resistor R4 respectively form positive and negative outputs Vout+, Vout− of bi-forward converter 1200.

Inductors L18, L19, L15, L16 form a transformer T4. Inductors L18, L19 form primary windings of transformer T4. Inductors L15, L16 form a center-tapped secondary winding of transformer T4. The center-tapped secondary winding of transformer T4 provides voltages to drive transistors Q8, Q9.

Bi-forward converter 1200 operates substantially similar to bi-forward converter 900. That is, bi-forward converter 1200 receives a substantially DC voltage (e.g., a rectified AC voltage) from power source Vin.

In operation, during a transformer set period (D9Ts shown in FIG. 13)—e.g., when (switching) transistor Q10 turns on, the nodes that are designated with an "A" of each respective inductors L15, L16, L18, L19 is positive with respect to the nodes that are designated with a "B". Clamping diode D4 turns off as the voltage on node "A" of inductor L19 is positive. Transistor Q9 turns on as the voltage on node "A" of inductor L15 is positive. The Vgs voltage of transistor Q8 and the drain-to-source voltage (Vds) of transistor Q9 are equal to zero when transistor Q9 is on. Transistor Q8, therefore, turns off. Current flows from node "A" of inductor L16 through inductor L17, Vout+, capacitor C4 and resistor R4, Vout−, transistor Q9 and returns to node "B" of inductor L16. Node "C" of inductor L17 is positive with respect to node "D" of inductor L17.

During a transformer reset period (D10Ts shown in FIG. 13)—e.g., when transistor Q10 turns off—the polarity of voltages across all windings change relative to when the transformer is in a set period. That is, the voltage on node "A" of each respective inductors L15, L16, L18, L19 is negative with respect to the voltage on node "B". Clamping diode. D4 turns on as the voltage on node "A" of inductor L19 becomes negative to reset transformer T4. Transistor Q8 turns on as the voltage on node "B" of inductor L16 is positive. The Vgs of transistor Q9 and the Vds of transistor Q8 equals zero during a time that transistor Q8 is on. Therefore, transistor Q9 turns off. Current flows from node "B" of inductor L15 through inductor L17, Vout+, capacitor C4 and resistor R4, Vout−, transistor Q8 and returns to node "A" of inductor L15. Node "C" of inductor L17 is positive with respect to node "D".

When the reset period ends, the voltage across all windings reach almost zero. A freewheeling period (D12Ts shown in FIG. 13) begins. The polarity of the voltage across inductor L17 switches. That is, node "C" of inductor L17 becomes negative with respect to node "D", and turns on diodes DQ3 and DQ4. Current flows from node "D" of inductor L17 through Vout+, capacitor C4 and resistor R4, Vout−, diodes DQ3 and DQ4, respectively, inductors L15 and L16, respectively, then merges at the center tap point (between inductors L15 and L16), and returns to node "C" of inductor L17.

As with bi-forward converter 900, bi-forward converter 1200 is operable to transfer energy to the secondary winding of a transformer (e.g., transformer T4) during an on-time and off-time of a switching transistor (e.g., transistor Q10).

FIG. 13 illustrates a timing diagram 1300 of a voltage Vs of bi-forward converter 1200 with respect to time. Timing diagram 1300 also illustrates voltages VL18, VL16 and VL15 that represent voltages across inductors L18, L16 and L15, respectively. Ts represents one period cycle for transistor Q10. D9Ts represents a time period during which transistor Q10 is on and clamping diode D4 is off (transformer set period). D10Ts represents a time period during which clamping diode D4 is on and transistor Q10 is off (transformer reset period). D11Ts represents a time period during which clamping diode D4 is off and transistor Q10 is off. As shown in FIG. 13, voltage Vs of bi-forward converter 1200 is equal to $$Vs=(Vin)*(N2/N1) \qquad (eq. 6)$$

during time periods D6Ts and D7Ts, and is equal to zero during time period D8Ts. The LC filter composed of inductor L17 and capacitor C4 removes all harmonics from voltage Vs and only a DC component of Vs is transferred to Vout. From a Fourier transformation, the DC component of Vs can be computed as the average value of Vs. An average value for output voltage Vs of converter 1200 is therefore given by the following equation:

$$Rms\ Vout=Vs\ average=(1/Ts)*\{[Vin(N2/N1)D9Ts]+ [Vin(N2/N1)D10Ts]+[0*(N2/N1)D11Ts]\}$$

$$Rms\ Vout=(Vin)*(N2/N1)*(D9+D10) \qquad (eq. 7)$$

where N2 represents a number of turns of the first center tapped secondary winding of transformer T4, N1 represents a number of turns of the primary windings of transformer T4, Vin represents the source voltage, D9Ts represents the time period during which a switching transistor (e.g., transistor Q10) is on and clamping diode D4 is off, and D10Ts represents the time period during which the switching transistor (e.g., transistor Q10) is off and clamping diode D4 is on. As shown by equation (7), bi-forward converter 1200 is operable to transfer energy to secondary winding of a transformer T4 during an on time and off time of a switching transistor (e.g., transistor Q10). That is energy can be transferred from primary to secondary during both set and reset periods of the transformer).

A number of implementations have been described. Nevertheless, it will be understood that various modifications may be made without departing from the spirit and scope of the invention. For example, the bi-forward converter topologies described above—e.g., bi-forward converters 700, 900, 1200 can be implemented with a DC-DC converter. Moreover, the bi-forward converter topologies discussed above can be used within power supplies to supply power to devices other than halogen lamps—for example, DC power supplies for telecommunications equipment and computer equipment. In addition, an auxiliary secondary winding can be used to drive transistors within a secondary of a transformer in a two-transistor converter circuit as shown in FIG. 14. FIG. 14 illustrates a two-transistor converter circuit 1400 including inductors L20-L25, transistors Q10-Q13, clamping diodes D5-D6, a capacitor C5, and a resistor R5. Inductors L20, L21, L22 form a transformer T5. Inductors L23 and L24 represents a center-tapped auxiliary second winding that is used to drive transistors Q12, Q13 in the secondary of transformer T5. Energy can be transferred from primary to secondary when both transistors Q10 and Q11 are on (transformer set period) and off (transformer reset period). Accordingly, other implementations are within the scope of the following claims.

What is claimed is:

1. A power supply comprising:
    a bi-forward converter operable to convert an alternating current (AC) input voltage into an AC output voltage;
    a controller directly coupled with the bi-forward converter and operable to control a voltage level of the AC output voltage;
    a feed forward circuit operable to detect a peak AC voltage associated with the AC input voltage, the feed forward circuit including:
        a voltage divider operable to divide the AC input voltage, and
        a peak detector operable to detect a peak AC voltage associated with the divided AC input voltage and send the detected peak AC voltage to the controller; and
    a dimmer and feedback circuit operable to provide a feedback dimming control voltage to the controller,
    wherein the controller is further operable to adjust the AC output voltage of the bi-forward converter responsive to the peak AC voltage detected by the feed forward circuit and the feedback dimming control voltage provided by the dimmer and feedback circuit such that the AC output voltage remains substantially constant over a range of detected peak voltages including the detected peak AC voltage.

2. The power supply of claim 1, wherein the controller is a Pulse Width Modulation (PWM) controller operable to adjust a duty cycle of the bi-forward converter.

3. The power supply of claim 1, wherein the dimmer and feedback circuit comprises:
a filter operable to filter a feedback signal associated with the AC output voltage of the bi-forward converter to provide a filtered feedback signal;
a peak detector operable to detect a peak AC voltage associated with the filtered feedback signal; and
a potential dimming circuit operable to generate the feedback dimming control voltage using the detected peak AC voltage associated with the filtered feedback signal.

4. The power supply of claim 3, wherein the potential dimming circuit comprises an operational amplifier operable to compare the detected peak AC voltage associated with the filtered feedback signal with an adjustable voltage reference that corresponds with the AC output voltage of the bi-forward converter.

5. The power supply of claim 1, wherein the bi-forward converter comprises a transformer having a primary winding and a secondary winding, and wherein the bi-forward converter is operable to transfer energy from the primary winding to the secondary winding during an on-time and during an off-time of a switching transistor associated with the bi-forward converter.

6. A power supply comprising:
a bi-forward converter operable to convert an alternating current (AC) input voltage into an AC output voltage;
a feed forward circuit operable to detect a peak AC voltage associated with the AC input voltage; and
a controller directly coupled to the bi-forward converter and operable to generate a control voltage based on the detected peak AC voltage to control the bi-forward converter such that the AC output voltage remains substantially constant over a range of detected peak voltages including the detected peak AC voltage,
wherein the bi-forward converter is further operable to adjust the AC output voltage responsive to the control voltage; and
wherein the feed forward circuit includes:
a voltage divider operable to divide the AC input voltage, and
a peak detector operable to detect the peak AC voltage associated with the divided AC input voltage and send the detected peak AC voltage to the controller.

7. The power supply of claim 6, wherein the controller is a Pulse Width Modulation (PWM) controller.

8. The power supply of claim 6, further comprising a dimmer circuit operable to generate a feedback dimming control voltage responsive to the AC output voltage of the bi-forward converter and provide the feedback dimming control voltage to the controller, the controller operable to control a level of the AC output voltage of the bi-forward converter responsive to the feedback dimming control voltage.

9. The power supply of claim 8, wherein the controller adjusts a duty cycle of the control voltage responsive to the feedback dimming control voltage.

10. The power supply of claim 8, wherein the dimmer circuit comprises:
a filter operable to filter a feedback signal associated with the AC output voltage of the bi-forward converter producing a filtered feedback signal;
a peak detector operable to detect a peak AC voltage associated with the filtered feedback signal; and
a potential dimming circuit operable to generate the feedback dimming control voltage using the detected peak AC voltage associated with the filtered feedback signal.

11. The power supply of claim 6, further comprising a current limit circuit operable to send an error signal to the controller in an event that the power supply exceeds a predetermined current limit, the controller operable to shut down the bi-forward converter responsive to the error signal.

12. The power supply of claim 6, further comprising a full wave rectifier operable to rectify an alternating current (AC) voltage and generate the AC input voltage to the bi-forward converter.

13. The power supply of claim 12, wherein the full wave rectifier is a bridge rectifier.

14. The power supply of claim 6, wherein the bi-forward converter comprises a transformer having a primary winding and a secondary winding, and wherein the bi-forward converter is operable to transfer energy from the primary winding to the secondary winding during an on-time and during an off-time of a switching transistor associated with the bi-forward converter.

15. The power supply of claim 14, wherein the secondary winding comprises a first secondary winding and a second secondary winding, the second secondary winding operable to drive transistors associated with a secondary of the transformer.

16. The power supply of claim 15, wherein the first secondary winding and the second secondary winding are each center tapped.

17. The power supply of claim 14, wherein a secondary of the transformer does not contain any transistors.

18. The power supply of claim 14, wherein a secondary of the transformer includes one or more transistors that are driven by a voltage across the secondary winding of the transformer.

19. The power supply of claim 14, wherein the bi-forward converter further comprises an LC filter operable to filter high frequency components associated with the AC output voltage of the bi-forward converter.

20. A method comprising:
converting, by a bi-forward converter, an alternating current (AC) input voltage into an AC output voltage;
detecting, by a feed forward circuit, a peak AC voltage associated with the AC input voltage including:
dividing, by a voltage divider, the AC input voltage, and
detecting, by a peak detector, the peak AC voltage associated with the divided AC input voltage, and
sending, by the peak detector, the detected peak AC voltage to a controller;
generating, by the controller, a first control voltage responsive to the detected peak voltage that adjusts the AC output voltage such that the AC output voltage remains substantially constant over a range of detected voltage peak values; and
adjusting, by the bi-forward converter, the AC output voltage responsive to the first control voltage.

21. The method of claim 20, further comprising generating a dimming control voltage operable to control a level of the AC output voltage.

22. The method of claim 21, further comprising adjusting a duty cycle of the first control voltage responsive to the dimming control voltage.

23. The method of claim 20, further comprising rectifying an alternating current (AC) voltage to generate the AC input voltage.

24. A power supply comprising:

means for converting an alternating current (AC) input voltage into an AC output voltage;

means for controlling directly coupled to the means for converting and operable to control a voltage level of the AC output voltage;

means for detecting a peak AC voltage associated with the AC input voltage; and means for providing a feedback dimming control voltage to the means for controlling, the means for providing including:

means for filtering a feedback signal associated with the AC output voltage of the means for converting, and providing a filtered feedback signal, means for detecting a peak AC voltage associated with the filtered feedback signal, and means for generating the feedback dimming control voltage using the detected peak AC voltage associated with the filtered feedback signal including means for comparing the detected peak AC voltage associated with the filtered feedback signal with an adjustable voltage reference that corresponds with the AC output voltage of the means for converting, wherein the means for controlling includes means for adjusting the AC output voltage of the means for converting responsive to the peak AC voltage and the feedback dimming control voltage such that the AC output voltage remains substantially constant over a range of detected peak voltages including the detected peak AC voltage.

25. The power supply of claim 24, wherein the means for controlling includes means for adjusting a duty cycle of the means for converting in accordance with pulse width modulation.

26. The power supply of claim 24, wherein the means for detecting comprises:

means for dividing the AC input voltage, wherein the means for detecting detects a peak AC voltage associated with the divided AC input voltage and sends the detected peak AC voltage to the means for controlling.

27. The power supply of claim 24, wherein the means for converting comprises transformer means having a primary winding means and a secondary winding means, and wherein the means for converting includes means for transferring energy from the primary winding means to the secondary winding means during an on-time and during an off-time of a switching transistor means associated with the means for converting.

28. A power supply comprising:

means for converting an alternating current (AC) input voltage into an AC output voltage;

means for detecting a peak AC voltage associated with the AC input voltage; and means for generating a control voltage that adjusts the AC output voltage based on the peak AC voltage such that the AC output voltage remains substantially constant over a range of detected peak voltages including the detected peak AC voltage, wherein the means for converting further includes means for adjusting the AC output voltage responsive to the peak AC voltage detected by the means for detecting a peak AC voltage, wherein the means for detecting a peak AC voltage further includes:

means for dividing the AC input voltage, and means for detecting the peak AC voltage associated with the divided AC input voltage and sending the detected peak AC voltage to the means for generating the control voltage.

29. The power supply of claim 28, wherein the means for generating a control voltage includes a Pulse Width Modulation (PWM) controller means.

30. The power supply of claim 28, further comprising means for generating a feedback dimming control voltage responsive to the AC output voltage of the means for converting, and providing the feedback dimming control voltage to the means for generating a control voltage, the means for generating a control voltage operable to control a level of the AC output voltage of the means for converting responsive to the feedback dimming control voltage.

31. The power supply of claim 30, wherein the means for generating a control voltage includes means for adjusting a duty cycle of the control voltage responsive to the feedback dimming control voltage.

32. The power supply of claim 30, wherein the means for generating a feedback dimming control voltage comprises:

means for filtering a feedback signal associated with the AC output voltage of the means for converting, and producing a filtered feedback signal;

means for detecting a peak AC voltage associated with the filtered feedback signal; and means for generating the feedback dimming control voltage using the detected peak AC voltage associated with the filtered feedback signal.

33. The power supply of claim 28, further comprising means for sending an error signal to the means for generating a control voltage in an event that the power supply exceeds a predetermined current limit, the means for generating a control voltage including means for shutting down the means for converting responsive to the error signal.

34. The power supply of claim 28, further comprising means for rectifying an alternating current (AC) voltage and generating the AC input voltage to the means for converting.

35. The power supply of claim 34, wherein the means for rectifying includes bridge rectifier means.

36. The power supply of claim 28, wherein the means for converting comprises transformer means having primary winding means and secondary winding means, and wherein the converting means includes means for transferring energy from the primary winding means to the secondary winding means during an on-time and during an off-time of a switching transistor means associated with the means for converting.

37. The power supply of claim 36, wherein the secondary winding means comprises a first secondary winding means and a second secondary winding means, the second secondary winding means operable to drive transistor means associated with a secondary means of the transformer means.

38. The power supply of claim 37, wherein the first secondary winding means and the second secondary winding means are each center tapped.

39. The power supply of claim 36, wherein a secondary means of the transformer means does not contain any transistor means.

40. The power supply of claim 36, wherein a secondary means of the transformer means includes one or more transistor means that are driven by a voltage across the secondary winding means of the transformer means.

41. The power supply of claim 36, wherein the means for converting further comprises means for filtering high frequency components associated with the AC output voltage of the means for converting.

* * * * *